US012732490B2

(12) United States Patent
O'Broin

(10) Patent No.: US 12,732,490 B2
(45) Date of Patent: Sep. 8, 2026

(54) REDUCING BLUETOOTH CONNECTION LATENCY USING SELECTIVE GATT CACHE REQUESTS

(71) Applicant: Cisco Technology, Inc., San Jose, CA (US)

(72) Inventor: Jason Paul O'Broin, Alameda, CA (US)

(73) Assignee: Cisco Technology, Inc., San Jose, CA (US)

( * ) Notice: Subject to any disclaimer, the term of this patent is extended or adjusted under 35 U.S.C. 154(b) by 263 days.

(21) Appl. No.: 17/974,328

(22) Filed: Oct. 26, 2022

(65) Prior Publication Data

US 2024/0146705 A1 May 2, 2024

(51) Int. Cl.

| | |
|---|---|
| ***H04L 9/40*** | (2022.01) |
| ***G16Y 30/10*** | (2020.01) |
| ***H04W 76/10*** | (2018.01) |

(52) U.S. Cl.
CPC ........... *H04L 63/062* (2013.01); *H04W 76/10* (2018.02); *G16Y 30/10* (2020.01)

(58) Field of Classification Search
None
See application file for complete search history.

(56) References Cited

U.S. PATENT DOCUMENTS

| | | | | |
|---|---|---|---|---|
| 9,294,903 | B2 | 3/2016 | Palin et al. | |
| 10,349,354 | B2 | 7/2019 | Kvetny et al. | |
| 10,735,467 | B2 | 8/2020 | Yang et al. | |
| 11,758,598 | B1 * | 9/2023 | Narula | H04W 12/50 455/41.2 |
| 2018/0359633 | A1 * | 12/2018 | Liu | H04L 9/3226 |
| 2019/0028445 | A1 * | 1/2019 | McLaughlin | H04L 63/0428 |
| 2020/0120587 | A1 * | 4/2020 | Prasad | H04W 48/08 |
| 2022/0030505 | A1 | 1/2022 | Lee et al. | |
| 2022/0292202 | A1 * | 9/2022 | Manevich | G06F 21/53 |

FOREIGN PATENT DOCUMENTS

| | | | |
|---|---|---|---|
| WO | WO-2008040201 A1 * | 4/2008 | H04L 12/189 |
| WO | WO-2022178871 A1 * | 9/2022 | H04L 67/12 |

OTHER PUBLICATIONS

Bluetooth Core Specification—Part G. Generic Attribute Profile (GATT) (Year: 2016).*

"Mesh Strengthens Bluetooth Wireless' IoT Credentials", online: https://www.nordicsemi.com/News/2018/02/Mesh-strengthens-Bluetooth-wireless-IoT-credentials, 2018, accessed Jun. 6, 2022, 8 pages.

Nao, Laura, "BLE Pairing and Bonding", online: https://technotes.kynetics.com/2018/BLE_Pairing_and_bonding/, 2018, accessed Sep. 8, 2022, 9 pages.

(Continued)

*Primary Examiner* — Younes Naji
(74) *Attorney, Agent, or Firm* — Lee & Hayes, P.C.

(57) ABSTRACT

In one embodiment, a first device obtains generic attribute (GATT) information from a second device. The first device also obtains long term key information by forming a Bluetooth connection with a second device. The first device performs an exchange with the second device to validate the long term key information. The first device obtains, based on the exchange, updated GATT information from the second device, when the long term key information is no longer valid.

18 Claims, 7 Drawing Sheets

(56) References Cited

OTHER PUBLICATIONS

"GATT / Introduction to Bluetooth Low Energy / Adafruit Learning System", online: https://learn.adafruit.com/introduction-to-bluetooth-low-energy/gatt, accessed Sep. 8, 2022, 15 pages.
Ong, Chee Yi, "The Ultimate Guide to AndroidBluetooth Low Energy", online: https://punchthrough.com/android-ble-guide/, May 2020, accessed Sep. 8, 2022, 62 pages, Punch Through.
Townsend, et al., "Chapter 4. GATT (Services and Characteristics)", online: https://www.oreilly.com/library/view/getting-started-with/9781491900550/ch04.html, accessed Sep. 13, 2022, 35 pages.
Stafford, Gary, "BLE and GATT for IoT: Getting Started with Bluetooth Low Energy and theGeneric Attribute Profile Specification for IoT", online: https://programmaticponderings.com/2020/08/04/getting-started-with-bluetooth-low-energy-ble-and-generic-attribute-profile-gatt-specification-for-iot/, accessed Sep. 8, 2022, 21 pages.

* cited by examiner

REDUCING BLUETOOTH CONNECTION LATENCY USING SELECTIVE GATT CACHE REQUESTS

TECHNICAL FIELD

The present disclosure relates generally to computer networks, and, more particularly, to reducing Bluetooth connection latency using selective generic attribute (GATT) cache requests.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room. In other words, the IoT has expanded to include many operational technology (OT) networks, as well.

One popular wireless protocol used in many IoT networks is Bluetooth Low Energy (BLE), which was specifically designed to reduce the power consumption associated with the wireless communications. In the context of the IoT, this is particularly attractive, as many IoT devices are battery powered, thereby greatly extending the length of time needed between battery changes. Indeed, many IoT sensors are often located in hard to reach places (e.g., on ceilings, walls, etc.), making their periodic maintenance relatively challenging.

While BLE offers many benefits for use in the IoT, it is not a perfect solution. More specifically, the security mechanisms of BLE are not optimal for certain IoT applications. In addition, it has been observed that the traditional operation of BLE could also introduce unnecessary latency when forming connections between IoT devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
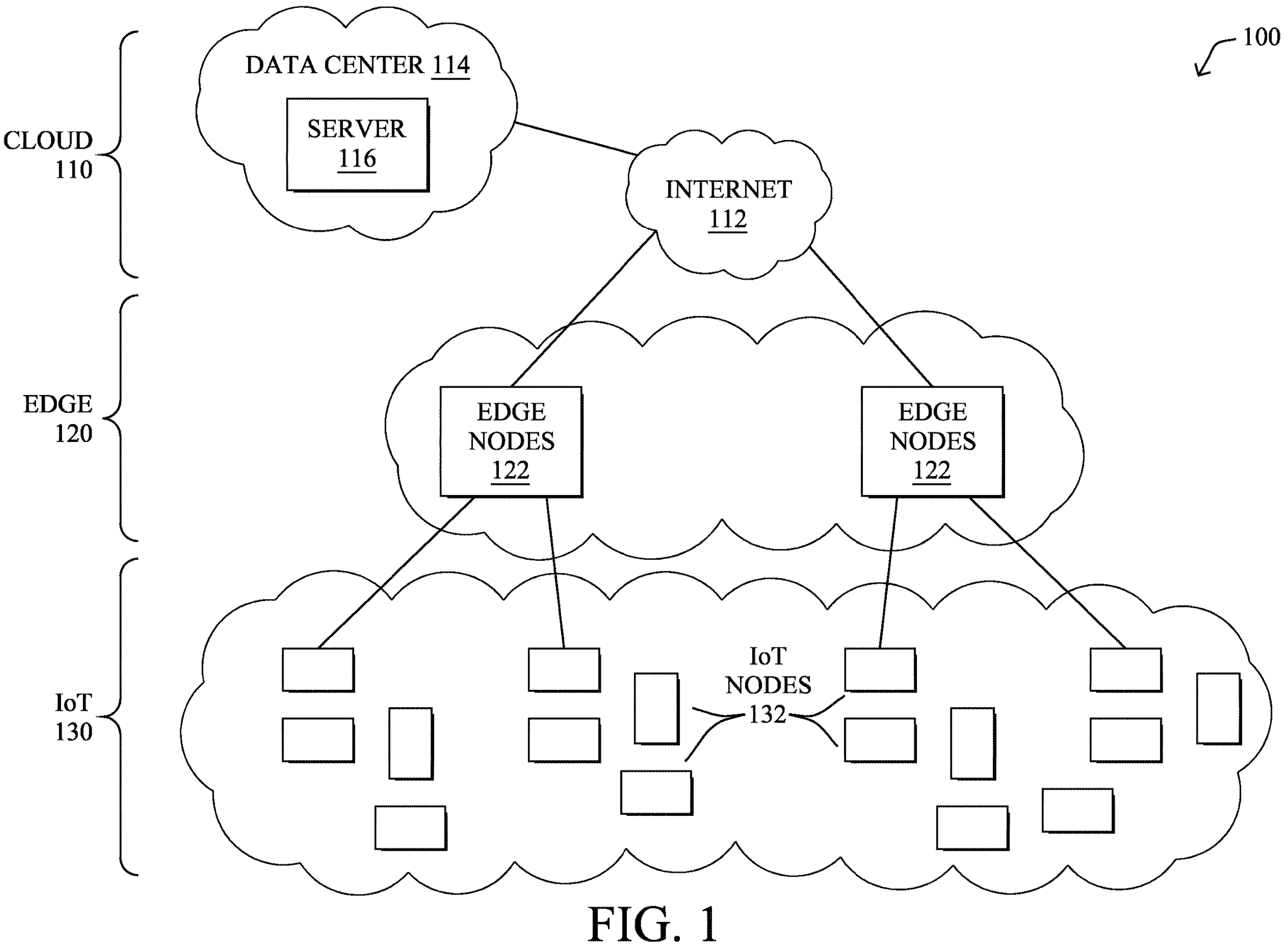
FIG. 1 illustrate an example computer network.

According to one or more embodiments of the disclosure, a first device obtains generic attribute (GATT) information from a second device. The first device also obtains long term key information by forming a Bluetooth connection with a second device. The first device performs an exchange with the second device to validate the long term key information. The first device obtains, based on the exchange, updated GATT information from the second device, when the long term key information is no longer valid.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, a edge node is a functional node that is deployed close to edge endpoints to provide computing, storage, and networking resources and services. Multiple edge nodes organized or configured together form a edge system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, a edge system can include any number of virtualized services and/or data stores that are spread across the distributed edge nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
5) Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely a cloud layer 110, an edge layer 120, and an IoT device layer 130. Illustratively, cloud layer 110 may comprise general connectivity via the Internet 112, and may contain one or more datacenters 114 with one or more centralized servers 116 or other devices, as will be appreciated by those skilled in the art. Within the edge layer 120, various edge nodes/devices 122 (e.g., with edge modules, described below) may execute various edge computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
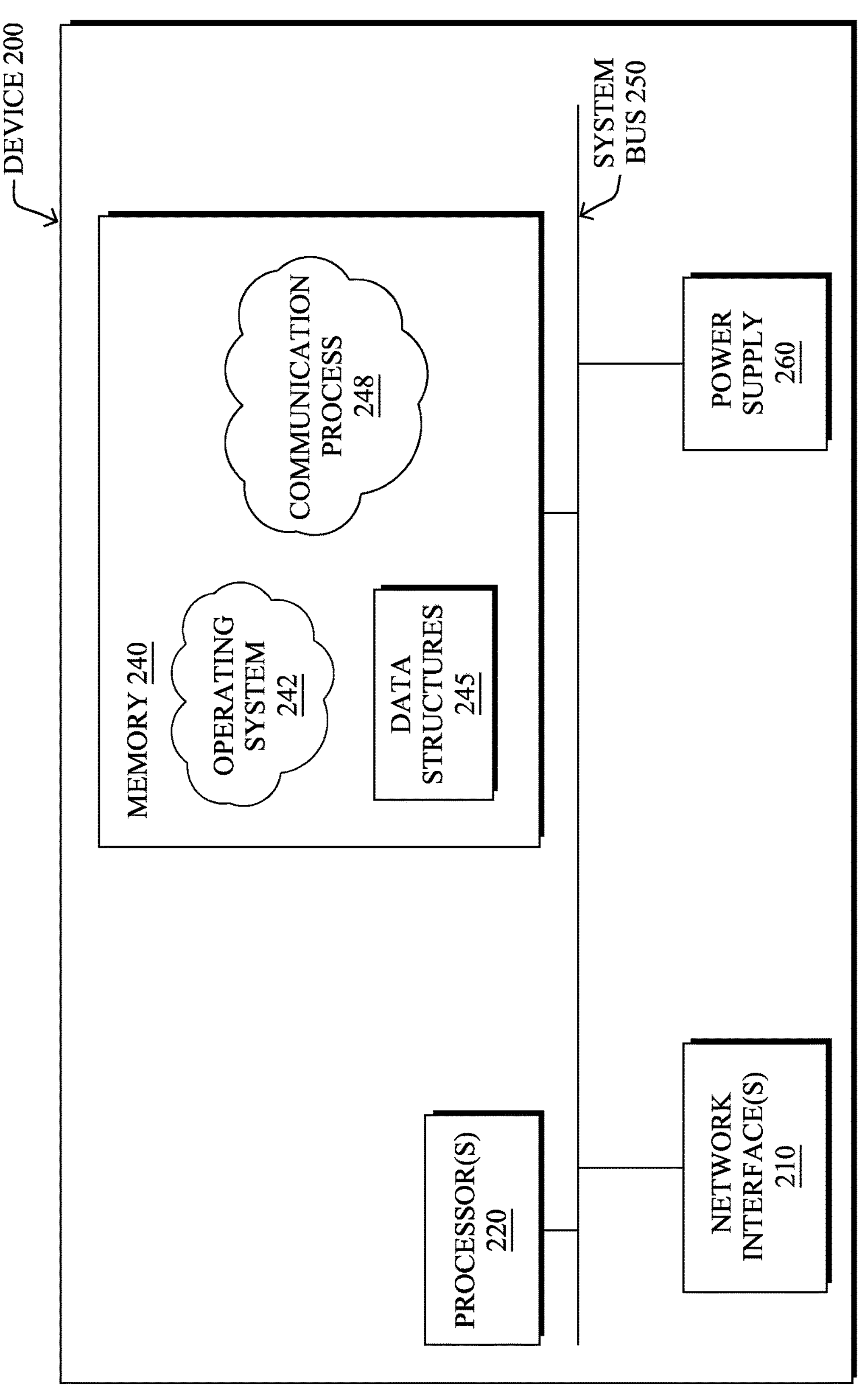
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein. Note that while communication process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, many IoT networks are implemented as wireless networks that leverage Bluetooth Low Energy (BLE) for their wireless communications. As would be appreciated, BLE typically operates in the 2.4 GHz spectrum with forty channels, three of which are devoted to beaconing and the rest for data. Once a BLE device has been discovered via this beaconing, communications are then shifted over to one of the data channels.

To secure the communications between two BLE devices, the devices may perform a pairing exchange whereby the devices authenticate their respective identities and exchanging the keys needed to encrypt their connection. In BLE, bonding devices extends the concept of pairing whereby the devices store the keying information from their pairing, so that they can reconnect with one another without having to repeat the pairing exchange.

Generally, the keys used in BLE fall into the following categories:

- Temporary Key—this may be used during pairing to generate a short term key.
- Short term key—this is used to encrypt the connection when the two BLE devices are initially paired.
- Long term key—this is distributed once the initial pairing mechanism has encrypted the connection using the short term key information and is used going forward to encrypt the connection.

Various BLE pairing mechanisms have been introduced over the years, the selection of which affects the specific key information exchanged between the devices during pairing. More specifically, the pairing of BLE 4.0 and 4.1 devices is done using what is now referred to as “Legacy” pairing. Under legacy pairing, the devices exchange temporary key information, verify that they are using the same temporary key, and then use it to create a short term key to encrypt the connection. If the devices are bonded, additional information is also exchanged, including long term key information, so that the two devices can reconnect without first having to perform the pairing again from scratch.

BLE 4.2 and beyond are also able to use what is known as “Secure Connections” for their pairing, in lieu of Legacy pairing. Under this approach, Elliptic Curve Diffie Hellman (ECDH) public key cryptography is leveraged, to simply use a single long term key to encrypt the connection, foregoing the use of temporary and short term keys, entirely.

Another BLE mechanism that is also commonly used in IoT networks is a generic attribute (GATT) profile. In general, GATT profiles are used as part of the attribute (ATT) data protocol, which specifies how two BLE devices send data between one another. Typically, the two devices fall into the following categories:

- A peripheral device—by definition, a peripheral BLE device may only be connected to a single BLE device at any given time. In the context of the IoT, distributed sensors, actuators, and the like are typically treated as peripheral devices.
- A central device—unlike a peripheral device, a central device in BLE may have connections with multiple peripheral devices at one. For instance, an IoT gateway may be connected via BLE to multiple peripheral devices, thereby providing external network connectivity to them, such as via the Internet.

GATT profiles in BLE take the form of a collection of two distinct forms of information:

- Characteristics—each characteristic in a GATT profile refers to a specific type of data available from the BLE device, which may be a singular data point or an array of data points (e.g., an array of three values for a 3-axis accelerometer).
- Services—services in a GATT profile logically group characteristics available from the BLE device. For instance, a given service may include characteristics associated with a particular type of sensor measurement, the location of the sensor itself, etc.

Both characteristics and services in a GATT profile may be assigned 128-bit Universal Unique Identifiers (UUIDs), which are mapped to 16-bit ‘handles.’ Once the handle of the target device is known by a particular device, it can use that handle to address the target device for any subsequent communications.

When a connection is formed between the two BLE devices, the central device, also referred to as the “GATT client,” sends a request to the peripheral device, also referred to as the “GATT server,” for its GATT information, to learn the UUIDs needed to request information from the peripheral device. Thus, in the case of an IoT sensor forming a BLE connection with a gateway device, the sensor may send its GATT information to the gateway (e.g., from its GATT cache/table), thereby allowing the gateway to request sensor measurements or other information from the sensor via their BLE connection.

Typically, the GATT profile information of a BLE device is used to specify the BLE device with which it communicates and is persisted for extended periods of time. However, the handles in a GATT profile are not fixed and are assigned whenever the BLE device boots. This means that the handles in the GATT profile information of a given BLE device may change between reboots, such as when the configuration of that device changes.

To ensure that the GATT profile information obtained by one BLE device (e.g., an IoT gateway) from another (e.g., an IoT sensor or actuator) is up to date, a GATT discovery exchange is typically performed between the two devices, whenever they form a BLE connection. This ensures that the client has the updated GATT information from the server, so that it can request data from it via their BLE connection.

Testing has shown that the GATT discovery exchange can add approximately 1.5 seconds of latency, depending on the BLE implementation, to the formation of a connection between the BLE devices. In the context of the IoT, this latency can be compounded by the fact that any given gateway may form connections with many IoT devices, often on the order of over one hundred such devices per gateway.

An observation herein is that the connection latency attributable to the GATT discovery exchange can be avoided through the use of selective GATT cache requests. More specifically, certain inferences can be made by a BLE device as to whether the GATT information of another BLE device has changed. If the device infers that the GATT cache of the other device has not changed, it may skip the GATT discovery exchange, thereby reducing the latency associated with forming a connection with the other device.

—Reducing Bluetooth Connection Latency Using Selective GATT Cache Requests—

The techniques introduced herein reduce the latency of forming a connection between BLE devices by caching the GATT information of a GATT server and infer the status of that information based on the state of the longer term key information shared with the other device/GATT server. In some aspects, if the long term key information used to encrypt the connections between the devices is out of date, the GATT client may infer that the GATT information of the server is also out of date and perform a GATT discovery exchange with that device, when re-connecting to it.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Specifically, according to various embodiments, a first device obtains generic attribute (GATT) information from a second device. The first device also obtains long term key information by forming a Bluetooth connection with a second device. The first device performs an exchange with the second device to validate the long term key information. The first device obtains, based on the exchange, updated GATT information from the second device, when the long term key information is no longer valid.

Figure 3A:
FIGS. 3A-3D illustrate examples of Bluetooth devices communicating with one another.
Figure 3A:
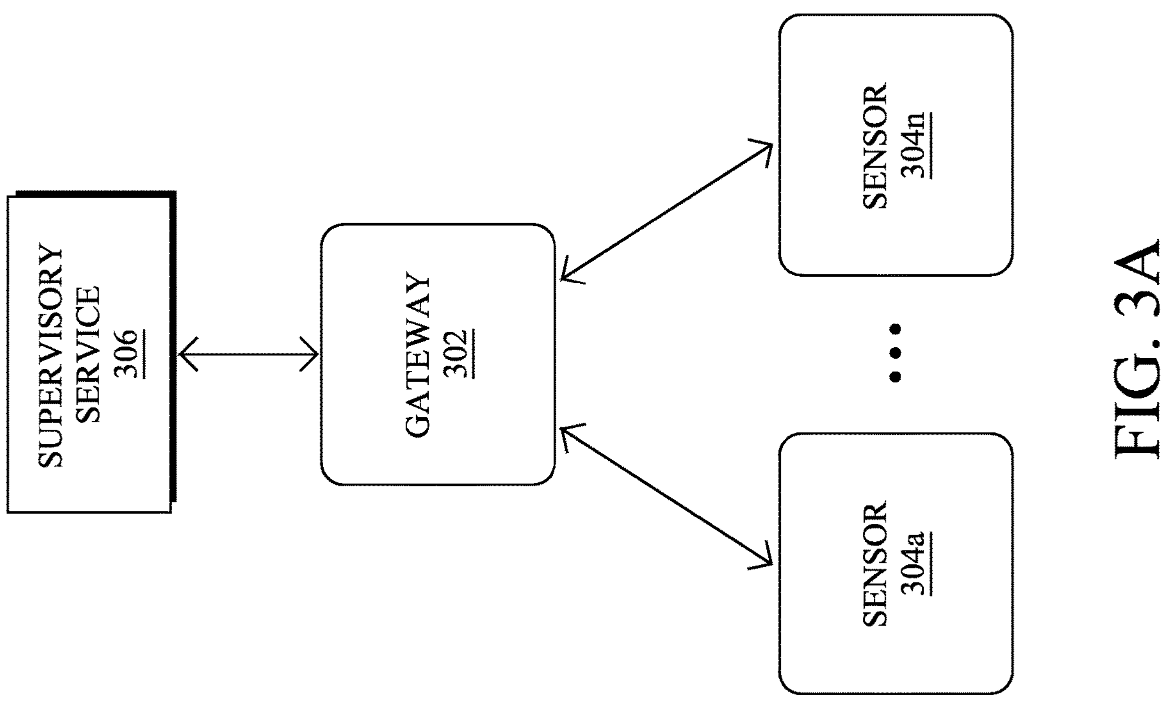

Operationally, FIGS. 3A-3D illustrate examples of Bluetooth devices communicating with one another, according to various embodiments. As shown in FIG. 3A, a simplified IoT network 300 is illustrated, whereby any number of sensors **304*a*-304*n* (e.g., a first through $n^{th}$ sensor) are physically distributed throughout a location. Such sensors 304*a*-304*n* may take the form of BLE devices that are configured to take any number of sensor measurements. For instance, sensors 304*a*-304*n* may include, but is are not limited to, temperature sensors, humidity sensors, light sensors, occupancy sensors, microphones, cameras, infrared (IR) sensors, accelerometers, vibration sensors, etc., regarding the physical location and/or a monitored process performed within the location (e.g., a manufacturing process, etc.). As would be appreciated, while sensors are shown in FIGS. 3A-3D** for illustrative purposes, IoT networks may include other forms of endpoint nodes/devices, such as actuators, relays, or the like.

During operation, sensors **304*a*-304*n* may each form a wireless connection with a gateway 302, such as BLE connections, in accordance with any of the BLE standards. In addition, in various embodiments, gateway 302 and sensors 304*a*-304*n* may make use of the ATT data protocol within BLE, such as by performing a GATT cache discovery exchange when forming a connection with one another. This allows a GATT client, such as gateway 302, to request certain data from any of its connected sensors 304*a*-304*n***, such as a particular sensor measurement taken by that sensor.

In some embodiments, gateway 302 may provide connectivity between sensors **304*a*-304*n* and a supervisory service 306, such as an external monitoring service that presents data from sensors 304*a*-304*n* to a user interface regarding the monitored location, a service responsible for overseeing the health of sensors 304*a*-304*n* (e.g., by installing software updates to them, etc.), or the like. In some embodiments, a security model may be implemented with respect to sensors 304*a*-304*n* whereby a secure unique device identifier (SUDI) certificate and key information is configured on a sensor 304 during its manufacture. This cryptographic information can then be used by supervisory service 306** to onboard the sensor in a trusted manner.

Figure 3B:
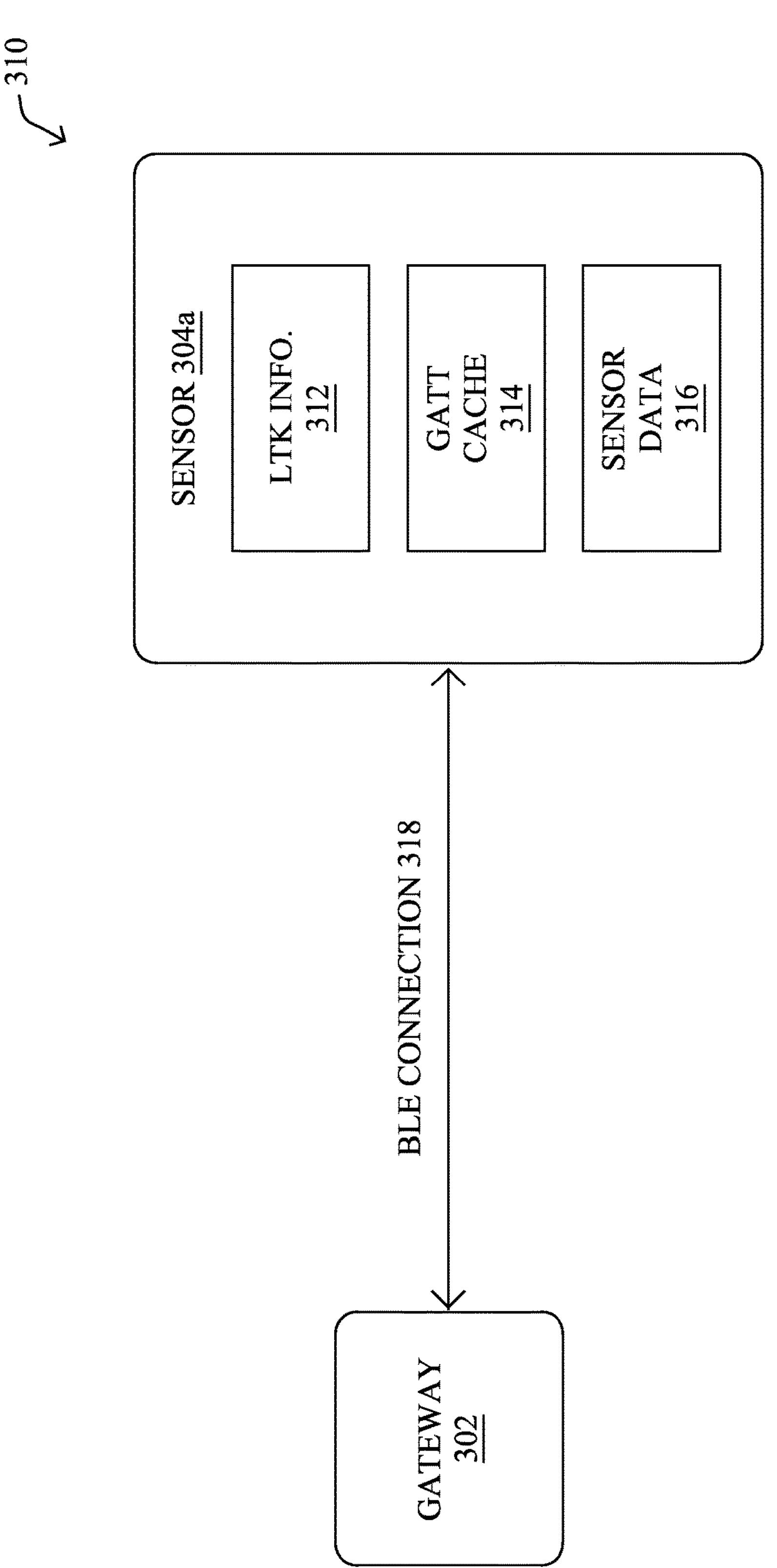
Figure 3C:
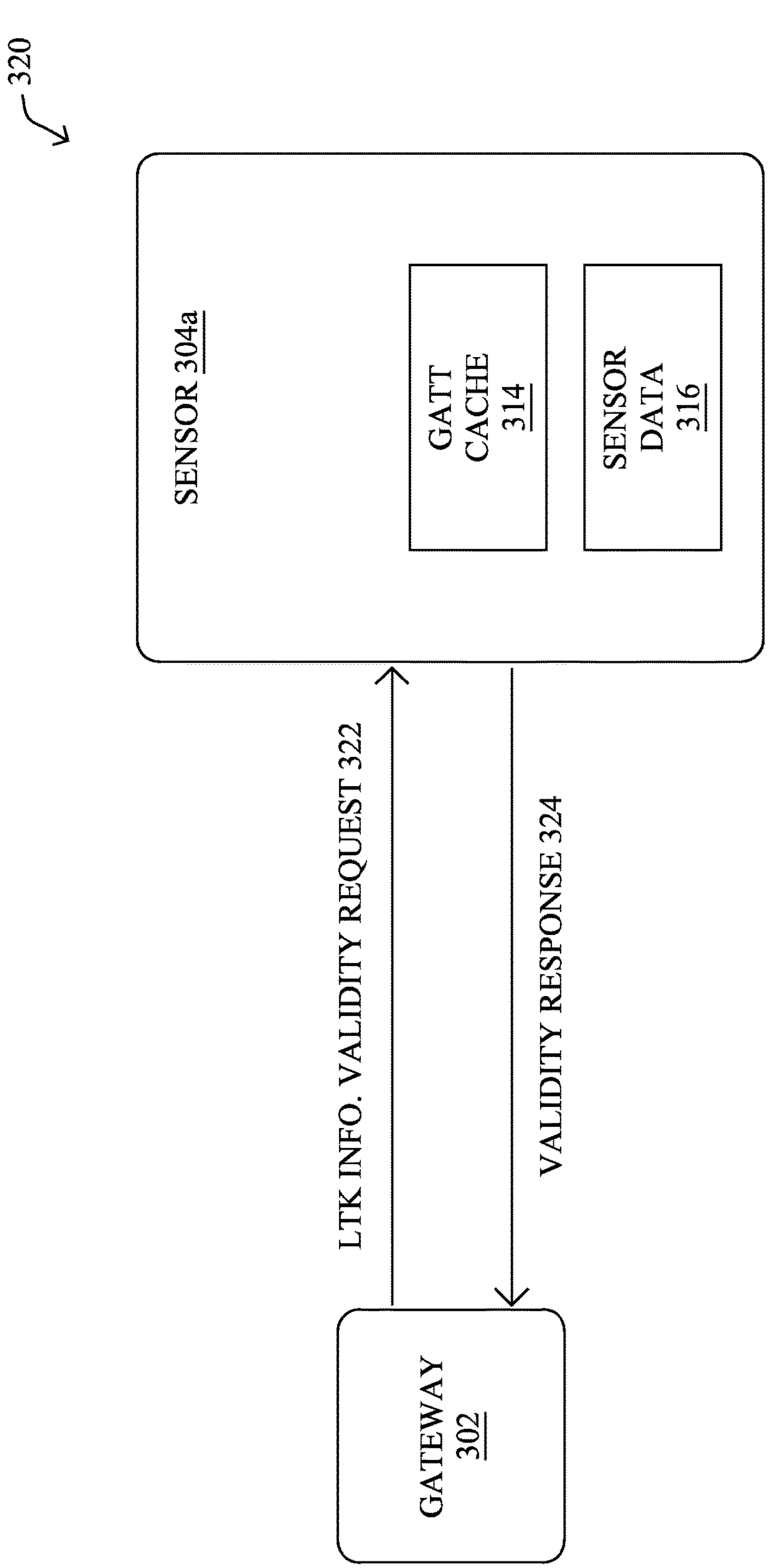

FIG. 3B illustrates an example 310 of the interactions between gateway 302 and a particular sensor, sensor **304*a*. As noted above, sensor 304*a* and gateway 302 may form a BLE connection 318 between one another, thereby establishing sensor 304*a* as a peripheral of gateway 302. During this process, gateway 302 and sensor 304*a* may exchange key information, such as long term key (LTK) information 312, which they will use to encrypt packets sent over BLE connection 318. In addition to obtaining this LTK information, gateway 302 may also obtain the GATT information stored in GATT cache 314 of sensor 304*a*. In turn, gateway 302 may use this information to request data from sensor 304*a* over BLE connection 318, once established, such as sensor data 316**.

Typically, LTK information 312 may be used by gateway 302 and sensor **304*a* to re-establish their connection 318, if it is ever lost (e.g., due to interference, sensor 304*a* entering into a sleep mode, etc.), without having to re-perform the exchange that they initially performed to form connection 318**.

In some embodiments, either or both of gateway 302 and sensor **304*a* may store their LTK information 312 in non-volatile memory. By doing so, this means that the LTK information 312 will be erased from that device, whenever the device reboots or otherwise loses power. For instance, sensor 304*a* may reboot after receiving a configuration update, a software update, etc. from supervisory service 306. Thus, as shown in example 320 in FIG. 3C, LTK information 312 may be erased from sensor 304*a***, as a consequence of the reboot.

When sensor **304*a* comes back online, gateway 302 may seek to re-establish BLE connection 318 with sensor 304*a*. However, since the corresponding LTK information 312 has been deleted by sensor 304*a* as a result of its reboot, this operation will fail. Conversely, if sensor 304*a* has not rebooted and still has its own LTK information 312, sensor 304*a* may simply use it to re-establish connection 318**.

According to various embodiments, gateway 302 may infer that the GATT cache information that it had previously obtained from sensor **304*a* has also been updated, when its own LTK information 312 associated with BLE connection 318 is no longer valid. Indeed, the handles used in GATT cache 314 of sensor 304***a* are likely to be updated after sensor 304*a* reboots, necessitating gateway 302 to discover this updated GATT information.

In some embodiments, gateway 302 may confirm the validity of LTK information 312 via a GATT characteristic of sensor 304*a*. In such a case, gateway 302 may send an LTK information validity request 322 to sensor 304*a* using its previously obtained GATT information from sensor 304*a*. In response, sensor 304*a* may return a validity response 324 to gateway 302 that has a specific format such that if the handle has been reused for another purpose, gateway 302 will either be unable to decode the format correctly or receive an invalid LTK result. Regardless, gateway 302 may assume that since the validation of LTK information 312 has failed, it will also need to re-obtain the GATT information from 302*a*.

Figure 3D:
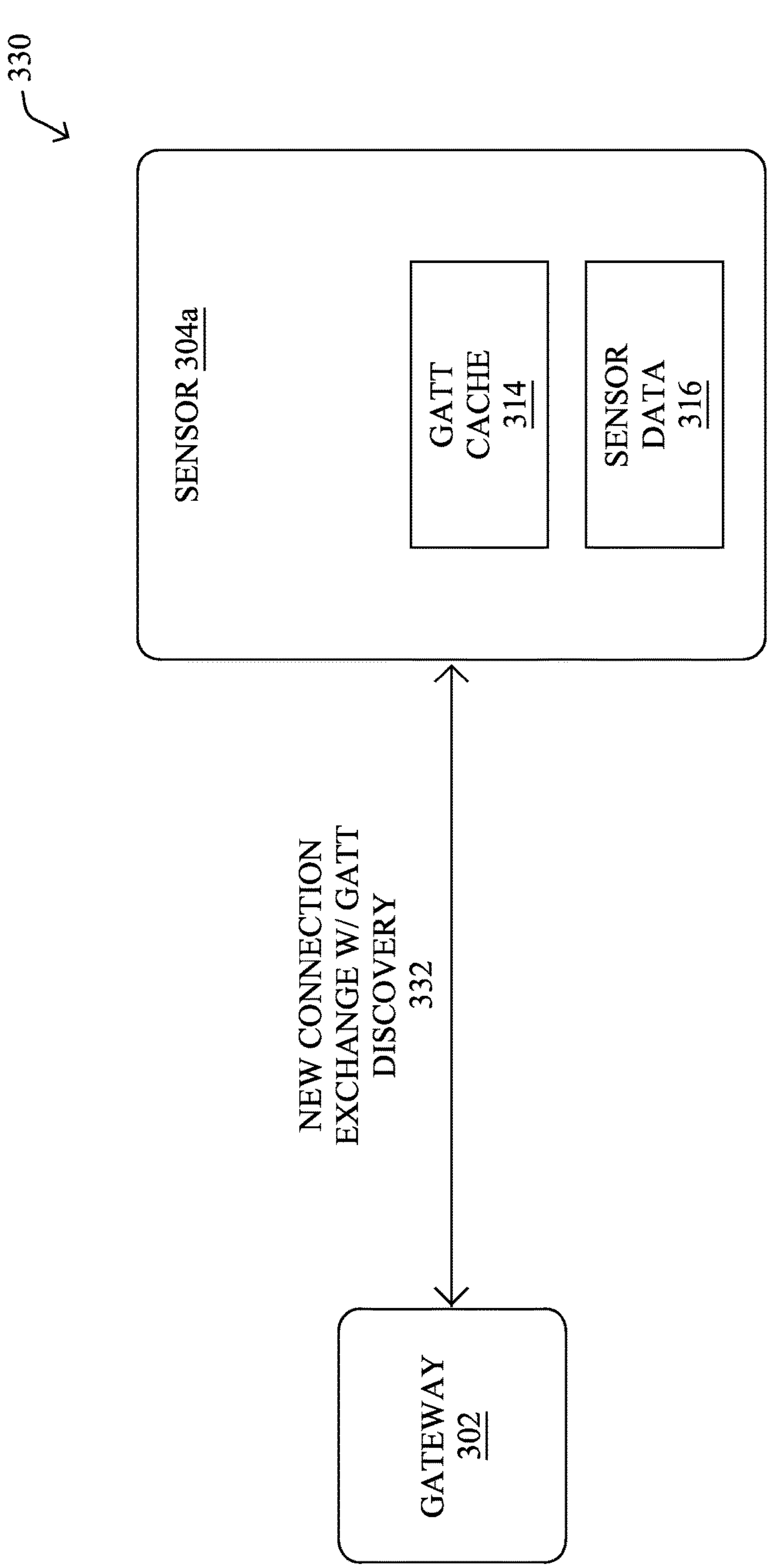

As shown in example 330 in FIG. 3D, when gateway 302 determines that the LTK information 312 associated with BLE connection 308 is no longer valid, it may perform a new connection exchange 332 with sensor 304*a* that includes a GATT discovery exchange. In doing so, this allows gateway 302 and sensor 304*a* to negotiate new LTK information, as well as updating gateway 302 with the updated GATT information in GATT cache 314 of sensor 304*a*.

Further embodiments provide for sensor 304*a* to have the ability to also signal any updates to its GATT cache 314 that occur outside of a reboot or other power loss event. To do so, in some embodiments, sensor 304*a* may simply delete its LTK information 312 when its GATT cache 314 has been updated. In doing so, gateway 302 will be unable to validate the LTK information that it previously negotiated with sensor 304*a* and the two devices may initiate a new connection exchange that includes a GATT discovery exchange, to allow gateway 302 to obtain the updated GATT information from sensor 304*a*.

As would be appreciated, the selective requesting of GATT information based on the validity of the LTK information shared by two BLE devices may still result in the GATT information being requested when it has not actually changed. However, this will still be a relatively rare occurrence.

Figure 4:
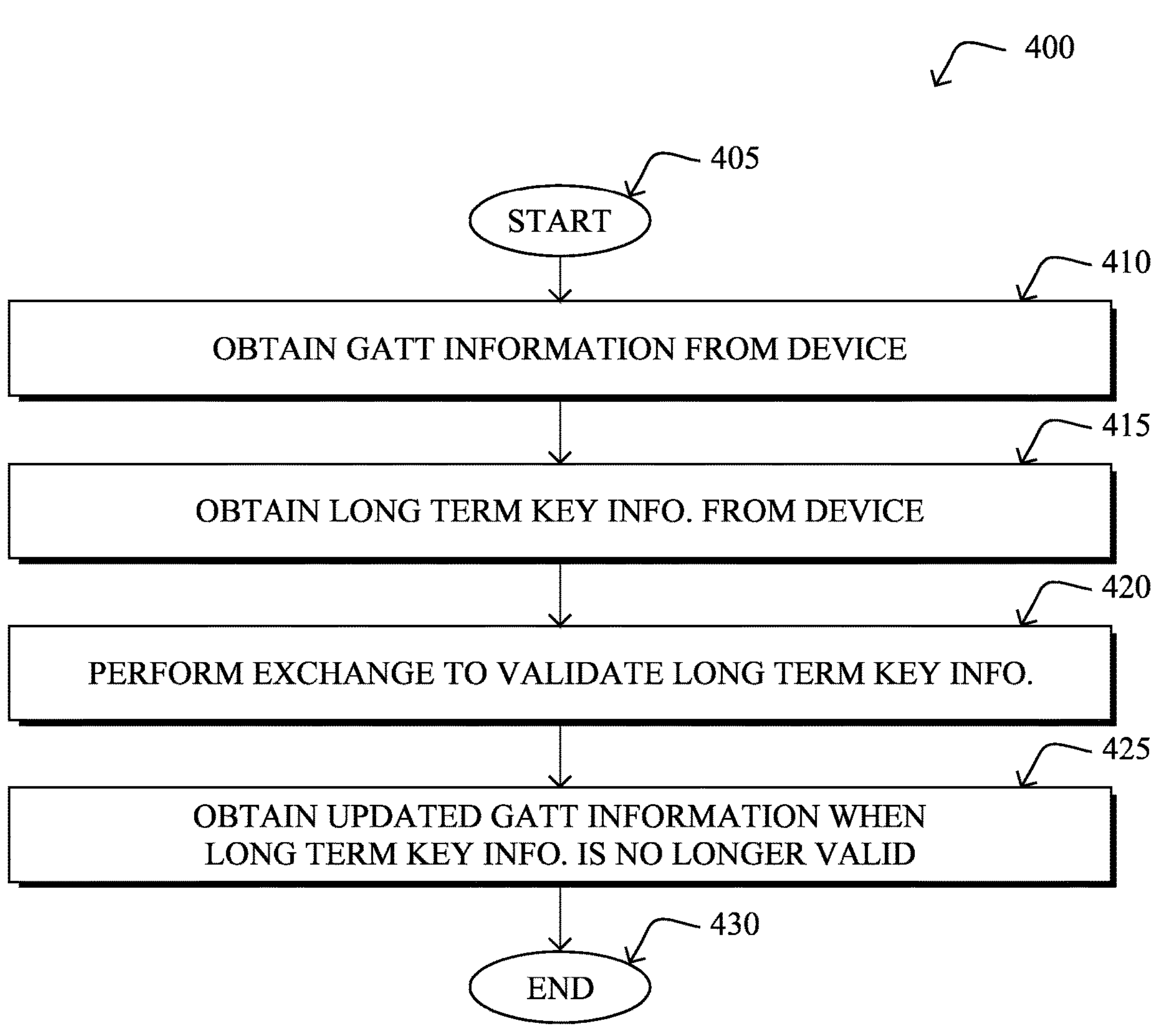
FIG. 4 illustrates an example simplified procedure for reducing Bluetooth connection latency using selective generic attribute (GATT) cache requests.

FIG. 4 illustrates an example simplified procedure for reducing Bluetooth connection latency using selective generic attribute (GATT) cache requests, in accordance with one or more embodiments described herein. The procedure 400 may start at step 405, and continues to step 410, where, as described in greater detail above, a first device in a network (e.g., device 200), a first device may obtain GATT information from the second device. In some embodiments, the GATT information includes an attribute handle for an attribute stored by the second device that can be requested by the first device via the Bluetooth connection.

At step 415, as detailed above, the first device may also obtain long term key information by forming a Bluetooth connection with a second device. In some embodiments, the first device or the second device stores the long term key information in a volatile memory. In some embodiments, the first device may be a network gateway, such as a gateway for an IoT network. In another embodiment, the second device is a wireless sensor. In some embodiments, the second device is onboarded to a supervisory service via the first device and using a security key configured on the second device during its manufacturing. In one embodiment, the first device may obtain the long term key information by performing a Bluetooth bonding exchange with the second device. Note, however, that the techniques herein may be performed without leveraging Bluetooth bonding, in further embodiments.

At step 420, the first device may perform an exchange with the second device to validate the long term key information, as described in greater detail above. In various embodiments, the second device invalidates the long term key information based on an update to its GATT information. For example, such an update may be attributable to a reboot of the second device (e.g., after a software update, etc.). As would be appreciated, such GATT information may be used to convey data between the first and second devices, such as captured sensor data or the like.

At step 425, as detailed above, the first device may obtain, based on the exchange, updated generic attribute information from the second device, when the long term key information is no longer valid. In further embodiments, the first device may make a determination that the GATT information does not need to be updated, when the long term key information is still valid.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for reducing Bluetooth connection latency using selective generic attribute (GATT) cache requests, it is to be understood that various other adaptations and modifications may be made within the intent and scope of the embodiments herein. For example, while the techniques herein are described with respect to certain types of wireless networks, the techniques herein are not limited as such and can be used in any other form of wireless network, as desired. Further, while certain protocols are used herein for illustrative purposes, the techniques herein can also be implemented using other suitable protocols, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:

obtaining, by a first device, generic attribute (GATT) information from a second device;

obtaining, by the first device, long term key information by forming a Bluetooth connection with the second device;

performing, by the first device, an exchange with the second device to determine whether the long term key information is valid or is no longer valid, wherein the exchange includes transmitting, by the first device, a key validity request and receiving, from the second device, a response indicating whether the long term key information is valid;

determining, by the first device, that the GATT information of the second device has changed based on at least one of the first device being unable to decode the response, the response indicating an invalid long term key result, or the first device failing to validate the long term key information; and obtaining, by the first device and based on the determining that the GATT information has changed, updated GATT information from the second device, when the long term key information is no longer valid, wherein the updated GATT information from the second device is attributable to a reboot of the second device.

2. The method as in claim 1, wherein the GATT information includes an attribute handle for an attribute stored by the second device that is requestable by the first device via the Bluetooth connection.

3. The method as in claim 1, wherein the first device or the second device stores the long term key information in a volatile memory.

4. The method as in claim 1, further comprising:

making, by the first device and based on the exchange, a determination that the GATT information does not need to be updated, when the long term key information is still valid.

5. The method as in claim 1, wherein the second device invalidates the long term key information based on the updated GATT information.

6. The method as in claim 1, wherein the first device is a network gateway.

7. The method as in claim 1, wherein the second device is a wireless sensor.

8. The method as in claim 1, wherein the second device is onboarded to a supervisory service via the first device and using a security key configured on the second device during its manufacturing.

9. The method as in claim 1, wherein obtaining the long term key information comprises:

performing a Bluetooth bonding exchange with the second device.

10. An apparatus, comprising:

one or more network interfaces to communicate with a network;

a processor coupled to the one or more network interfaces and configured to execute one or more processes; and a memory configured to store a process that is executable by the processor, the process, when executed, configured to:

obtain generic attribute (GATT) information from a device;

obtain long term key information by forming a Bluetooth connection with the device;

perform an exchange with the device to determine whether the long term key information is valid or is no longer valid, wherein the exchange includes transmitting a key validity request to the device and receiving, from the device, a response indicating whether the long term key information is valid;

determine that the GATT information of the device has changed based on at least one of being unable to decode the response, the response indicating an invalid long term key result, or failing to validate the long term key information; and obtain, based on the determining that the GATT information has changed, updated GATT information from the device, when the long term key information is no longer valid, wherein the updated GATT information from the device is attributable to a reboot of the device.

11. The apparatus as in claim 10, wherein the GATT information includes an attribute handle for an attribute stored by the device that is requestable by the apparatus via the Bluetooth connection.

12. The apparatus as in claim 10, wherein the apparatus or the device stores the long term key information in a volatile memory.

13. The apparatus as in claim 10, wherein the process when executed is further configured to:

make, based on the exchange, a determination that the GATT information does not need to be updated, when the long term key information is still valid.

14. The apparatus as in claim 10, wherein the device invalidates the long term key information based on the updated GATT information.

15. The apparatus as in claim 10, wherein the apparatus is a network gateway.

16. The apparatus as in claim 10, wherein the device is a wireless sensor.

17. The apparatus as in claim 10, wherein the device is onboarded to a supervisory service via the apparatus and using a security key configured on the device during its manufacturing.

18. A tangible, non-transitory, computer-readable medium storing program instructions that cause a first device to execute a process comprising:

obtaining, by the first device, generic attribute (GATT) information from a second device;

obtaining, by the first device, long term key information by forming a Bluetooth connection with the second device;

performing, by the first device, an exchange with the second device to determine whether the long term key information is valid or is no longer valid, wherein the exchange includes transmitting, by the first device, a key validity request and receiving, from the second device, a response indicating whether the long term key information is valid;

determining, by the first device, that the GATT information of the second device has changed based on at least one of the first device being unable to decode the response, the response indicating an invalid long term key result, or the first device failing to validate the long term key information; and obtaining, by the first device and based on the determining that the GATT information has changed, updated GATT information from the second device, when the long term key information is no longer valid, wherein the updated GATT information from the second device is attributable to a reboot of the second device.

* * * * *